(12) United States Patent
Hatjasalo et al.

(10) Patent No.: US 9,878,499 B2
(45) Date of Patent: *Jan. 30, 2018

(54) ELASTIC COMPOSITE STRUCTURE

(75) Inventors: Leo Hatjasalo, Helsinki (FI); Kari Rinko, Helsinki (FI)

(73) Assignee: OY OMS OPTOMEDICAL SYSTEMS LTD, Helsinki (FI)

( * ) Notice: Subject to any disclaimer, the term of this patent is extended or adjusted under 35 U.S.C. 154(b) by 474 days.

This patent is subject to a terminal disclaimer.

(21) Appl. No.: 11/605,481

(22) Filed: Nov. 29, 2006

(65) Prior Publication Data

US 2008/0020664 A1    Jan. 24, 2008

Related U.S. Application Data

(63) Continuation of application No. 10/129,187, filed as application No. PCT/FI00/00852 on Nov. 1, 2000, now Pat. No. 7,153,789.

(30) Foreign Application Priority Data

Nov. 3, 1999    (FI) ...................................... 19992367

(51) Int. Cl.
    *B29C 70/02*    (2006.01)
    *B29C 70/08*    (2006.01)
    (Continued)

(52) U.S. Cl.
    CPC .......... *B29C 70/025* (2013.01); *B29C 70/088* (2013.01); *B32B 5/26* (2013.01);
    (Continued)

(58) Field of Classification Search
    USPC ........... 428/377; 2/161.7, 167, 2.5; 264/108, 264/496
    See application file for complete search history.

(56) References Cited

U.S. PATENT DOCUMENTS

| 3,940,917 A | 3/1976 | Strachan |
| 3,974,320 A | 8/1976 | Gerlach et al. |
| (Continued) | | |

FOREIGN PATENT DOCUMENTS

| DE | 19734803 C1 | 3/1999 |
| EP | 0603745 A1 | 6/1994 |
| (Continued) | | |

*Primary Examiner* — Lynda Salvatore

(74) *Attorney, Agent, or Firm* — Venable LLP; Jeffri A. Kaminski

(57) ABSTRACT

The invention relates to an elastic composite structure, which is intended for use as a flexible, pliable and thin film structure in the manufacture of a 2- or 3-dimensional product, particularly for providing mechanical protection against cutting, puncturing and/or the like. The composite structure comprises firstly an elastomer system (1), which is constituted by at least one PUR- (polyurethane resin), PUD- (polyurethane dispersion), SI- (silicone) based elastomer material and/or the like, and secondly by a mechanically durable reinforcer system (2), such as a fabric, weave or knit structure (2*a*) made from one or more flexible hybrid yarns, an oriented flake reinforcement structure (2*c*) made from laminated flakes (y), and/or the like. The invention relates also to an elastic composite structure, which is intended for the above application and which comprises a reinforcement system (2) for reinforcing the same mechanically against cutting, puncturing and/or the like. In this respect, the composite structure's reinforcement system (2) is manufactured as a flake reinforcement composition, consisting of hard organic and/or inorganic components (y) and comprising at least one co-laminated hard polymer layer and an elastomer matrix (2; 2*b*) applied integrally in contact therewith.

13 Claims, 5 Drawing Sheets

Figure 1A:
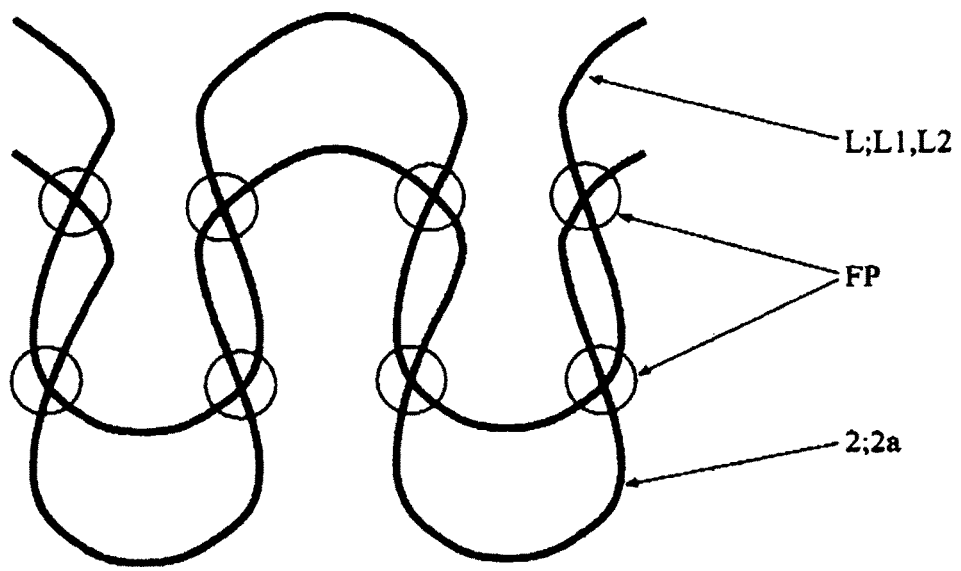

(51) Int. Cl.
*B32B 5/26* (2006.01)
*F41H 5/04* (2006.01)

(52) U.S. Cl.
CPC ........ *F41H 5/0478* (2013.01); *B32B 2305/08* (2013.01); *B32B 2305/10* (2013.01); *B32B 2305/30* (2013.01); *B32B 2319/00* (2013.01); *Y10T 442/2377* (2015.04); *Y10T 442/2615* (2015.04); *Y10T 442/3024* (2015.04); *Y10T 442/3065* (2015.04)

(56) References Cited

U.S. PATENT DOCUMENTS

| | | |
|---|---|---|
| 5,238,638 A | 8/1993 | Isayev |
| 5,260,380 A | 11/1993 | Isayev |
| 5,275,877 A | 1/1994 | Isayev |
| 5,407,612 A | 4/1995 | Gould et al. |
| 5,442,815 A | 8/1995 | Cordova et al. |
| 5,447,594 A | 9/1995 | Josefsson |
| 5,564,127 A | 10/1996 | Manne |
| 5,597,649 A | 1/1997 | Sandor et al. |

FOREIGN PATENT DOCUMENTS

| | | |
|---|---|---|
| EP | 0637614 A2 | 2/1995 |
| WO | WO-90/15898 A1 | 12/1990 |
| WO | WO-92/00343 A1 | 1/1992 |
| WO | WO-97/07859 A1 | 3/1997 |

ELASTIC COMPOSITE STRUCTURE

CROSS-REFERENCE TO RELATED APPLICATIONS

This application is a continuation of U.S. patent application Ser. No. 10/129,187 filed May 2, 2002, now U.S. Pat. No. 7,153,789, which was the national phase of PCT/FI00/00852, filed Nov. 1, 2000 and claims priority to Finnish patent application 19992367 filed Nov. 3, 1999.

The invention relates to an elastic composite structure, which is intended for use as a flexible, pliable and thin film structure in the manufacture of a 2- or 3-dimensional product, particularly for providing mechanical protection against cutting, puncturing and/or the like. The above type of elastic composite structures can be exploited e.g. in textile products for applications relating to health service and health care industry, as well as in a number of other contexts.

In reference to the prior art, e.g. Patent publications EP 0,318,415, U.S. Pat. No. 5,230,937, U.S. Pat. No. 3,974,320, U.S. Pat. No. 5,447,594, U.S. Pat. No. 4,338,370, and JP 6278247 disclose structures, which are based on fabric or non-woven constructed plies of material. All of the above are inadequate in terms of their functions, especially due to their lack of strain or stretching property, and hence inapplicable for the manufacture of products which particularly require elasticity. The reason for this is that the fabric or non-woven structures used in such products are only capable of providing pliable or flexible constructions, which are not, however, actually stretchable. The foregoing applies also largely to the solutions disclosed in Patent publications JP 62297333, JP 11172860, and JP 1096227, all of which are not necessarily provided with a so-called fabric or non-woven structure as a reinforcement but, for example, with carbon fiber systems or the like. Even these solutions cannot enable the manufacture of a 2- or 3-dimensional elastic product, since the discussed solutions are only capable of producing pliable structures. All the foregoing solutions may be able to produce even highly flexible structures, yet incapable of producing structures which would be uni-, not to mention bi- or triaxially stretchable, as required by elasticity.

The prior art further discloses the implementation of structures provided especially with a fabric-based reinforcement structure, e.g. as set forth in Patent publications WO 9200343 or JP 60259682. Even at its best, the strain provided by these solutions is less than 36%, which restricts significantly the usefulness of such solutions in the manufacture of products requiring special elasticity. The inadequate strain properties and high module of elasticity result from and are based on the fact that the fabric structures used in connection therewith are consistent with traditional technology. Thus, a sufficient elasticity is not provided thereby, since in practical applications, particularly with regard to the demands of health care industry, the minimum requirement for elasticity is easily about 100%.

It is an object with an elastic composite structure of this invention to provide a decisive improvement over the foregoing problems and, thus, to raise substantially the current state of the art. In order to carry out this objective, the elastic composite structure of the invention is principally characterized by what is set forth in the characterizing sections of the two independent claims directed thereto.

The most important benefits gained by an elastic composite structure of the invention include the simplicity of its construction and manufacture, which enables the manufacturing of products with very high elasticity, yet provided with sufficiently good mechanical strength properties, particularly against puncturing, cutting and/or the like. The inventive elastic composite structure is optionally feasible with a wide variety of constructions, the reinforcement system included therein being first of all constructible as a fabric, weave or knit structure made from a hybrid yarn, or else as an oriented flake reinforcement structure made from laminated flakes. In a preferred embodiment, the inventive fabric, weave or knit structure, shielded e.g. with a particularly elastic protective matrix, makes use of a hybrid yarn wound from rigid and elastic polymer fibers, thus effecting the maximization of an elasticity resource between friction points in a fabric, weave or knit structure. The inventive construction is also feasible by using one or more hard polymer layers, which is also integrally provided with an elastomer matrix for creating an elastic structure. It is further possible to exploit the invention as so-called combination structures by providing the same with both fabric-, weave- or knit-structured and laminate-structured reinforcement layers along with an elastomer matrix.

Thus, the inventive elastic composite structure offers a solution, which differs essentially and favourably from traditional solutions and which is applicable even in highly demanding conditions, e.g. in garments worn in the context of hospital hygiene as such, without separate and multilayer solutions dressed on top of each other.

Figure 1B:
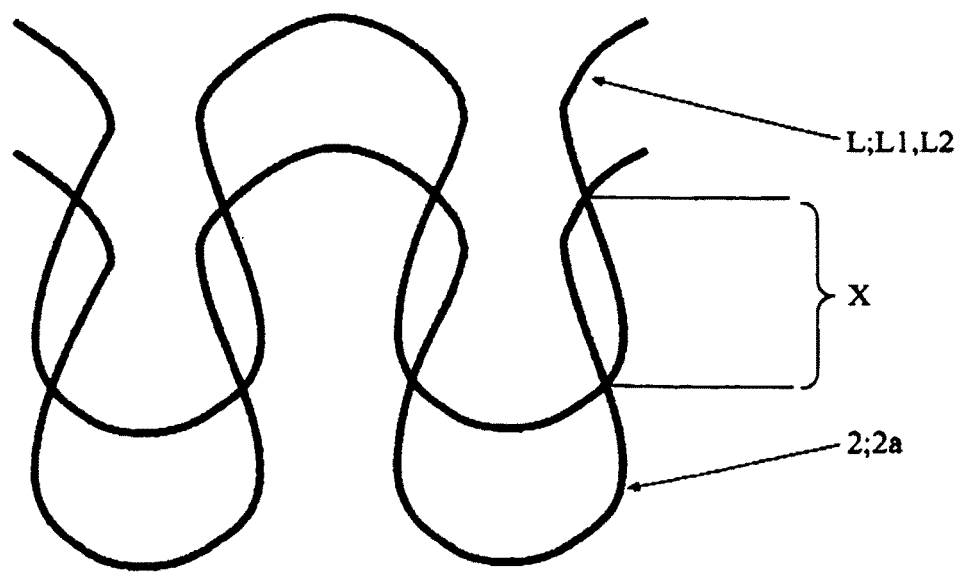
Figure 2A:
Figure 2B:
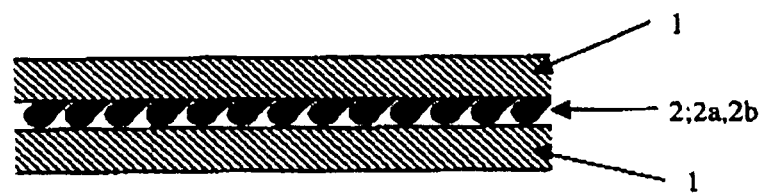
Figure 2C:
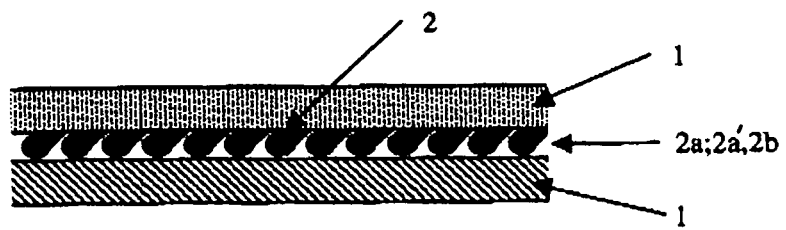
Figure 3A:
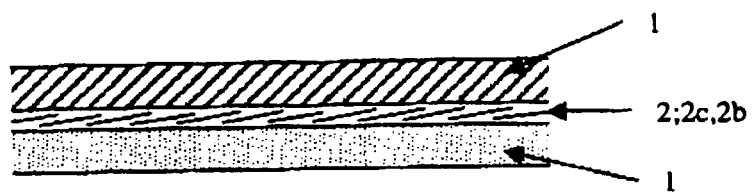
Figure 3B:
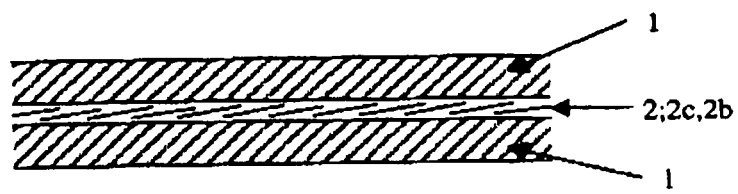
Figure 3C:
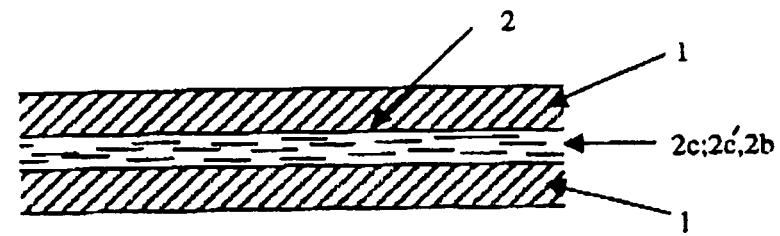
Figure 4A:
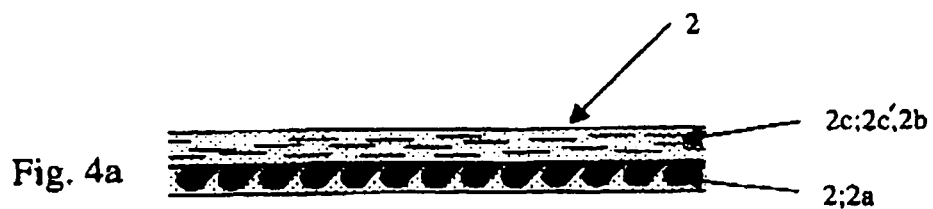
Figure 4B:
Figure 4C:
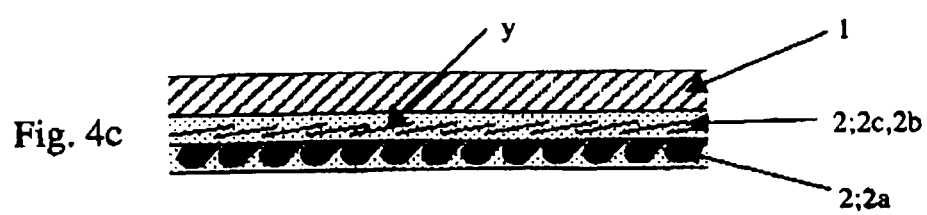
Figure 4D:
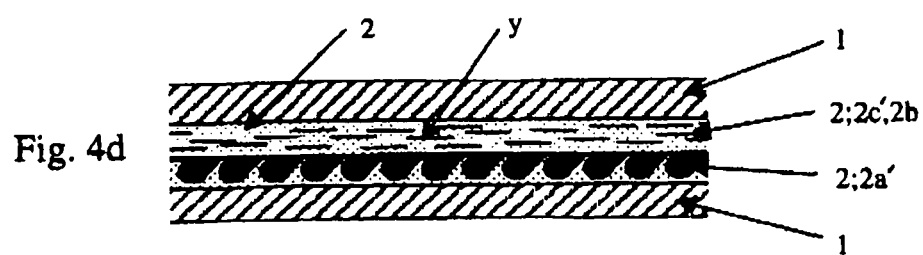
Figure 5A:
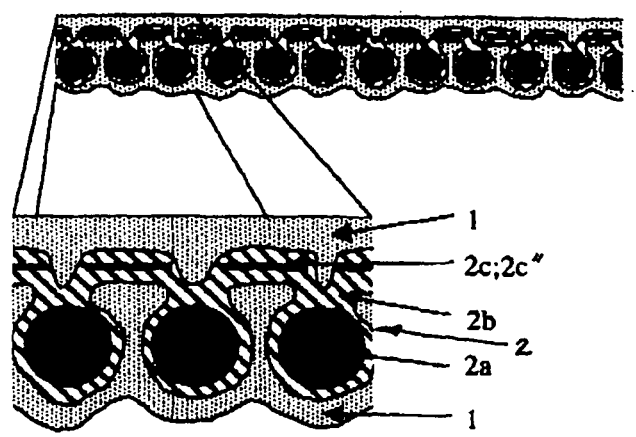
Figure 5B:
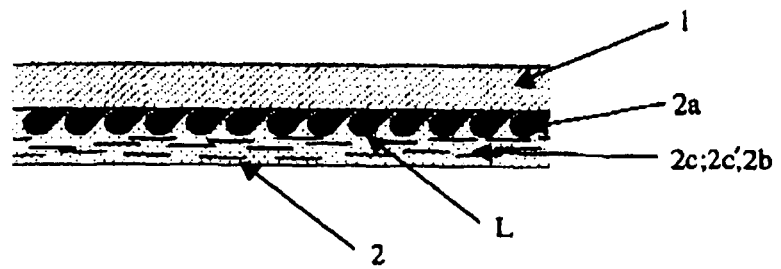

The invention will now be described in detail with reference made to the accompanying drawings, in which FIGS. 1a and 1b show a few preferred principles for an elastic composite structure of the invention, regarding particularly a knit-structured reinforcement system, FIGS. 2a-2c show a few optional constructions for an elastic composite structure of the invention, regarding particularly a fabric-, weave- or knit-structured reinforcement system, FIGS. 3a-3c show further a few preferred optional solutions for an elastic composite structure of the invention, regarding particularly a reinforcing flake-structured reinforcement system, FIGS. 4a-4d show further preferred embodiments for an elastic composite structure of the invention in the way of so-called combination structures, and FIGS. 5a and 5b show further a few preferred constructions for an elastic composite structure of the invention, which have been produced by means of certain types of manufacturing techniques.

The invention relates to an elastic composite structure, which is intended for use as a flexible, pliable and thin film structure in the manufacture of a 2- or 3-dimensional product, particularly for providing mechanical protection against cutting, puncturing and/or the like. The composite structure comprises firstly an elastomer system 1, which is constituted by one or more qualitatively different PUR- (polyurethane resin), PUD- (polyurethane dispersion), SI- (silicone) based elastomer materials and/or the like, and secondly by a mechanically durable reinforcer system 2, such as a fabric, weave or knit structure 2a made from one or more flexible hybrid yarns, an oriented flake reinforcement structure 2c made from laminated flakes y, and/or the like.

In a particularly preferred embodiment, a fabric structure, or the type of knit structure 2 depicted by way of example in FIGS. 1a and 1b, included in the reinforcement system of a composite structure, is manufactured from a hybrid yarn L wound from rigid and elastic polymer fibers L1, L2, such as liquid crystal polymer (LCP) and elastane fibers, particularly for the maximization of an elasticity resource x between friction points fp present in the fabric, weave or knit structure 2; 2a. This way, it is even possible to achieve a strain of e.g. 500% between the friction points. The hybrid yarn L is also relaxable e.g. by the application of heat, whereby the threaded multifilament structure thereof retains its carriage more effectively and provides the knit stitch with a proportional specific elasticity which is better than that obtained with a non-relaxed yarn. The manufacture of a hybrid yarn can be effected by using various fiber materials and systems, such as organic and inorganic fibers, mono- or multifilaments, for a variety of ultimate properties.

A knit structure constituted by the hybrid yarn L may be "overelastic" prior to coating, in spite of which, since the knitting loses some of its elasticity in the coating process, it is preferable that the hybrid yarn and the knitting be provided with as much of elasticity resource as possible in the above-described fashion. Naturally, a hybrid yarn can also be used for producing fabrics, weaves or the like.

In a preferred application, especially in reference to the embodiments depicted in FIGS. 2a-2c, a fabric 2; 2a' or knit structure 2a included in the reinforcement system of a composite structure is precoated/-impregnated partially or entirely with an elastic and soft elastomer matrix 2b, which, at a strain of 100%, has a modulus of elasticity of 1.0 Mpa or less, particularly for protecting the hybrid yarn L and the friction points fp of the fabric, weave or knit structure 2; 2a, or for retaining the optimal elasticity feature of the fabric, weave or knit structure by forming the composite structure's actual surface layer 1 on top of the soft elastomer matrix 2; 2b.

In a further preferred embodiment, the elastomer matrix 2; 2b of the fabric 2a; 2a', weave or knit structure 2a is fabricated on a multicomponent principle by firstly pretreating the fabric, weave or knit structure locally or entirely with a first component, the fabric, weave or knit structure being secondly further coated with a blend of components, such as by dipping, spraying and/or in a like manner, by using a blend of components containing a second and third component, whereby, during the coating process, the second component has reacted with the first component so as to produce a soft and elastic matrix 2; 2b around/on top of the fabric, weave or knit structure 2; 2a, and the third component has produced a mechanically more durable surface layer 1 on top of the soft elastomer matrix.

In this context, the first component may comprise e.g. a prepolymer, the second component may be a cross-linker or a chain extender/former, and, furthermore, the third component can be a neutralized, inert poly/elastomer.

Naturally, the above type of composite structure can also be prepared from a fabric, a weave or the like by coating as described above. The composite structure has a reinforcer content in the matrix preferably within the range of 5-95% by volume. With an optimized structure, it is possible to attain similar elasticity properties both in lengthwise and crosswise directions of the structure. This way, it is possible to vary the elasticity feature of a structure even over the range of 100%-1500%.

On the other hand, the invention relates to an elastic composite structure, which is intended for use as a flexible, pliable and thin film structure in the manufacture of a 2- or 3-dimensional product and which comprises a reinforcement system 2 for mechanically reinforcing the same against cutting, puncturing and/or the like. The reinforcement system 2 for a composite structure of the invention is prepared as a flake reinforcement system 2c, consisting of hard organic and/or inorganic materials and having its flakes y arranged as one or more hard polymer layers and, which contain an elastomer matrix 2; 2b adapted to provide the elastic structure with an integral composition. In this context, reference is made especially to FIGS. 3a-3c, all of which nevertheless include also the actual surface structure 1.

In a further preferred embodiment, the flake reinforcement for a composite structure of the invention is manufactured from a hard organic and/or inorganic material, having a surface area which is preferably >2 mm$^2$ and a thickness which is within the range of 0.02-1 mm, preferably by laminating from one or more hard polymer layers and by providing the laminated structure preferably also with extra reinforcements, such as an extremely thin and dense non-woven or fabric reinforcer or the like.

Preferred applications for this type of arrangement include e.g. the following solutions, wherein the flake reinforcement system 2; 2c is designed as an integral and comprehensive mechanical protective layer, in which one or more structural layers of the flake reinforcement system are established:

by applying the flakes y with mechanical and/or manual orientation to the surface of an elastomer coating 1;

by applying the flakes y to the surface of an elastomer coating 1 electrostatically by spraying along with the soft elastomer coating 2; 2b;

by applying the flakes y with free orientation to the surface of an elastomer 1; or by applying the flakes y electrostatically or pneumatically so as to locate the same as desired to constitute a desired type of orientation layer 2c; 2c'' prior to a subsequent elastomer coating 1, this application being depicted especially in FIG. 5a.

Referring especially to what is described above, orientation of the flakes y is most preferably carried out electrostatically in such a way that the flakes y have been polarified for a desired orientation by using, as an orientation pattern, a so-called imbricate structure or the like as shown e.g. in FIGS. 3a or 3b, or else a free orientation 2c; 2c' as shown e.g. in FIG. 3c.

In the preferred embodiments shown especially in FIGS. 4a-4d, the reinforcement system 2 included in a composite structure has been prepared from a combination of reinforcements, comprising the fabric, weave and knit structure 2a and the flake reinforcement layers 2c.

As a further preferred application, the flake reinforcement composition 2c is attached in this type of embodiment to the fabric, weave or knit structure 2a by means of an anchoring technique, the flake reinforcement being treated with a first component and the fabric, weave or knit structure, respectively, either comprehensively or locally, with a second component for providing a desired adhesion between the fabric, weave or knit structure and the flake reinforcement at a desired location.

In particular reference to the construction shown in FIG. 5b, a flake reinforcement system 2c; 2c' is provided on top of a fabric, weaved or knitted structural layer 2a, coupled with an elastomer coating 1, so as not to restrain the elasticity of the fabric, weaved or knitted structural layer, by the application of a multicomponent principle or the like, the flake reinforcement being treated with a third component, which does not provide an adhesion with the fabric, weave or knit structure 2a, or with a yarn L used therein.

It is obvious that the invention is not limited to the applications described or depicted above but, as disclosed in the following examples, it can be applied in most diverse variations. Thus, particularly cutting proof structures as shown especially in FIGS. 2a-2c, as well as puncture-proof structures as shown especially in FIGS. 3a-3c, or else both cutting- and puncture-proof structures as shown in FIGS. 4a-4c may of course be prepared by the application of most diverse manufacturing techniques, e.g. in such a way that such structures are pre-designed with a certain type of surface texture, such as groove patterns, nodule patterns or the like. In addition, the use of suitable manufacturing techniques, such as electrostatic coating, also enables the preparation of perfectly three-dimensional products, such as gloves or the like, which additionally provide a so-called perfect fit in such a way that, instead of tubular forms, the manufacturing process is set to produce structures having cross-sections which vary in the longitudinal direction thereof. Furthermore, the type of elasticity principles depicted particularly in FIGS. 2a and 2b will be fulfilled also in the case of fabric-, weave- or web-structured texture structure by using a twisted hybrid yarn.

The invention claimed is:

1. An elastic composite structure, comprising:
a mechanically durable reinforcing layer comprising an elastic fabric, weave or knit structure including a flexible hybrid yarn comprising wound rigid fibers and elastic polymer fibers, wherein the yarn is relaxable;
an elastic protecting matrix for the reinforcing layer comprising at least one of a polyurethane or silicone elastomer, the elastic protecting matrix comprising a prepolymer, a cross-linker or chain extender and a neutralized inert polymer/elastomer, the matrix providing an elastic and soft elastomer matrix at least partially precoating/impregnating the reinforcing layer, the elastic protecting matrix shielding the elastic fabric, weave or knit structure and rigid and elastic polymer fibers maximizing an elasticity of friction points in the elastic fabric, weave or knit structure, wherein the matrix has a modulus of elasticity of 1.0 Mpa or less at a strain of 100%; and
a surface layer covering the elastic protecting matrix, wherein the reinforcing layer comprises 5-95% by volume of the composite structure.

2. The composite structure according to claim 1, wherein the structure is a flexible, pliable thin structure.

3. The composite structure according to claim 1, wherein the structure is operative in the manufacture of a 2- or 3-dimensional product.

4. The structure according to claim 1, wherein the structure provides mechanical protection against cutting and puncturing.

5. The composite structure according to claim 1, wherein the elastic polymer fibers comprise elastane fibers.

6. The composite structure according to claim 1, further comprising:
rigid polymer fibers comprising liquid crystal polymer.

7. The composite structure according to claim 5, wherein the elastic polymer fibers maximize an elasticity resource between friction points present in the fabric, weave or knit structure.

8. The structure according to claim 1, wherein the reinforcing layer further comprises an oriented flake reinforcement structure comprising laminated flakes.

9. The composite structure according to claim 8, wherein the flakes comprise at least one of hard organic or inorganic materials, wherein the flakes are arranged as one or more hard polymer layers including an elastomer matrix adapted to provide the elastic structure with an integral composition.

10. The composite structure according to claim 8, wherein the flakes are polarified for a desired orientation by using, as an orientation pattern, an imbricate structure, or a free orientation.

11. The composite structure according to claim 8, wherein the flake reinforcement structure comprises an integral and comprehensive mechanical protective layer, wherein the flakes are applied with mechanical and/or manual orientation to the surface of an elastomer coating, applied to the surface of an elastomer coating electrostatically along with the soft elastomer coating, applied with free orientation to the surface of an elastomer, or applied electrostatically or pneumatically so as to locate the flakes as desired such that the flakes constitute a desired type of orientation layer prior to a subsequent elastomer coating.

12. The composite structure according to claim 1, wherein the flexible hybrid yarn is heat treated, and wherein the wound rigid and elastic polymer fibers comprise liquid crystal polymer and elastane fibers.

13. The composite structure according to claim 1, wherein the elastic protecting matrix comprises a first component comprising prepolymer, a second component comprising a cross-linking agent, and a third component comprising a neutralized, inert polymer/elastomer.

\* \* \* \* \*